US012404880B2

(12) United States Patent
Yamagoe

(10) Patent No.: US 12,404,880 B2
(45) Date of Patent: Sep. 2, 2025

(54) BOOM CONTROL SYSTEM OF WORK MACHINE

(71) Applicant: KOMATSU LTD., Tokyo (JP)

(72) Inventor: Yosuke Yamagoe, Tokyo (JP)

(73) Assignee: KOMATSU LTD., Tokyo (JP)

( * ) Notice: Subject to any disclaimer, the term of this patent is extended or adjusted under 35 U.S.C. 154(b) by 0 days.

(21) Appl. No.: 18/274,798

(22) PCT Filed: Feb. 4, 2022

(86) PCT No.: PCT/JP2022/004521

§ 371 (c)(1),
(2) Date: Jul. 28, 2023

(87) PCT Pub. No.: WO2022/176653

PCT Pub. Date: Aug. 25, 2022

(65) Prior Publication Data

US 2024/0102261 A1 Mar. 28, 2024

(30) Foreign Application Priority Data

Feb. 16, 2021 (JP) ................................ 2021-022390

(51) Int. Cl.
*F15B 11/044* (2006.01)
*E02F 9/22* (2006.01)

(52) U.S. Cl.
CPC .......... *F15B 11/044* (2013.01); *E02F 9/2203* (2013.01); *E02F 9/2207* (2013.01); *F15B 2211/3057* (2013.01); *F15B 2211/3127* (2013.01)

(58) Field of Classification Search
CPC ..... E02F 9/2203; E02F 9/2207; F15B 11/044; F15B 2211/3057; F15B 2211/3127
See application file for complete search history.

(56) References Cited

U.S. PATENT DOCUMENTS 5,138,838 A * 8/1992 Crosser ................ F15B 21/087 91/463
5,598,648 A 2/1997 Moriya et al.
2003/0230082 A1 12/2003 Wook Kim
2004/0011192 A1 * 1/2004 Frediani ................ F15B 11/044 91/465

(Continued)

FOREIGN PATENT DOCUMENTS

CN 101922162 A 12/2010
CN 104302930 A 1/2015

(Continued)

*Primary Examiner* — Matthew Wiblin
(74) *Attorney, Agent, or Firm* — Faegre Drinker Biddle & Reath LLP

(57) ABSTRACT

A boom cylinder drives a boom, and includes a head side oil chamber and a bottom side oil chamber. A first valve includes a first opening for discharging oil in the head side oil chamber to an oil tank, and supplies oil from a hydraulic pump to the head side oil chamber. A second valve includes a second opening for discharging oil in the bottom side oil chamber to the oil tank, and supplies oil from the hydraulic pump to the bottom side oil chamber. A controller individually controls an opening degree of the first opening and an opening degree of the second opening, during work including manipulation of the boom.

10 Claims, 7 Drawing Sheets

(56) References Cited

U.S. PATENT DOCUMENTS

| | | | | |
|---|---|---|---|---|
| 2010/0313557 | A1 | 12/2010 | Kim | |
| 2012/0163949 | A1 | 6/2012 | Okano et al. | |
| 2015/0107234 | A1 | 4/2015 | Ueda et al. | |
| 2016/0333551 | A1 | 11/2016 | Joung et al. | |
| 2018/0128292 | A1* | 5/2018 | Wang | F15B 11/006 |
| 2019/0024677 | A1* | 1/2019 | Rannow | E02F 9/2203 |

FOREIGN PATENT DOCUMENTS

| | | | | | |
|---|---|---|---|---|---|
| CN | 110144987 | A | | 8/2019 | |
| GB | 2298291 | A | * | 8/1996 | E02F 9/2025 |
| JP | S52-038101 | U | | 3/1977 | |
| JP | H03-066838 | A | | 3/1991 | |
| JP | H10-168950 | A | | 6/1998 | |
| JP | H11-158942 | A | | 6/1999 | |
| JP | 2000-204601 | A | | 7/2000 | |
| JP | 2011-002092 | A | | 1/2011 | |
| JP | 2011-052766 | A | | 3/2011 | |
| JP | 2011-236562 | A | | 11/2011 | |
| JP | 2019-210670 | A | | 12/2019 | |
| JP | 2020-153506 | A | | 9/2020 | |
| JP | 2021-038792 | A | | 3/2021 | |
| KR | 10-2015-0030328 | A | | 3/2015 | |

* cited by examiner

<SCRAPE-OFF>

<BREAKER>

<EXCAVATION ASSIST>

<SCRAPE-OFF MODE>

BOOM CONTROL SYSTEM OF WORK MACHINE

TECHNICAL FIELD

The present disclosure relates a boom control system of a work machine.

BACKGROUND ART

Japanese Patent Laying-Open No. H3-66838 (PTL 1) for example discloses a work machine such as hydraulic excavator having a boom float function. The boom float function refers to a function of enabling a boom to swing freely by having a head side oil chamber and a bottom side oil chamber of a boom cylinder communicating with an oil tank, without discharging hydraulic oil from a hydraulic pump to the boom cylinder.

CITATION LIST

Patent Literature

PTL 1: Japanese Patent Laying-Open No. H3-66838

SUMMARY OF INVENTION

Technical Problem

Work machines are utilized for various uses. In recent years, therefore, there has been a demand for the boom float function that can be applied to various uses.

In view of the above, an object of the present disclosure is to provide a boom control system of a work machine for which the boom float function is adjustable depending on a current work mode.

Solution to Problem

A boom control system of a work machine of the present disclosure includes a boom, a boom cylinder, a hydraulic pump, an oil tank, a first valve, and a second valve. The boom cylinder drives the boom and includes a head side oil chamber and a bottom side oil chamber. The first valve supplies oil from the hydraulic pump to the head side oil chamber and discharges the oil to the oil tank. The second valve supplies oil from the hydraulic pump to the bottom side oil chamber and discharges the oil to the oil tank. The first valve includes a first opening for discharging the oil in the head side oil chamber to the oil tank. The second valve includes a second opening for discharging the oil in the bottom side oil chamber to the oil tank. The boom control system of the work machine further includes a controller that individually controls an opening degree of the first opening and an opening degree of the second opening, during work including manipulation of the boom.

Advantageous Effects of Invention

According to the present disclosure, a work machine can be implemented for which the boom float function is adjustable depending on a current work mode.

DESCRIPTION OF EMBODIMENTS

Figure 1:
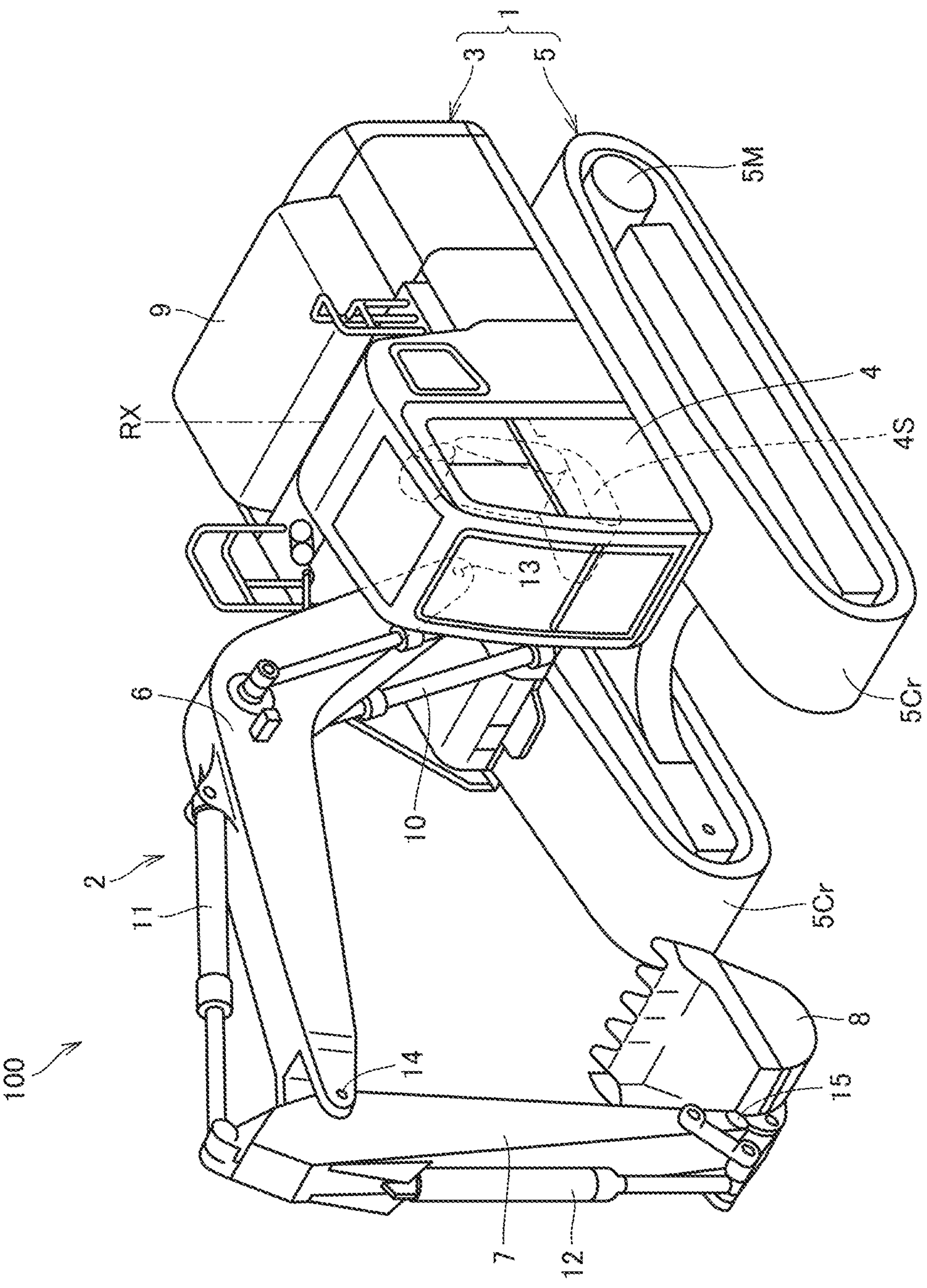
FIG. 1 is a perspective view schematically showing a configuration of a work machine according to one embodiment of the present disclosure.

Embodiments of the present disclosure are described hereinafter based on the drawings.

In the specification and the drawings, the same or corresponding components are denoted by the same reference characters, and a description thereof is not herein repeated. In the drawings, some components may not be shown or may be simplified for the sake of convenience of illustration. At least some of the embodiments and respective modifications may be combined with each other in any manner.

The present disclosure is applicable to work machines including at least a boom and a boom cylinder driving the boom, other than hydraulic excavator, and applicable to work machines manipulating the boom, such as wheel loader. In the following description, "upward," "downward," "front," "rear", "left" and "right" each refer to a direction with respect to an operator sitting on an operator's seat 4S in an operator's cab 4 shown in FIG. 1.

Configuration of Work Machine

First, a configuration of a work machine according to the present embodiment is described with reference to FIG. 1.

FIG. 1 is a perspective view schematically showing a configuration of a work machine according to one embodiment of the present disclosure. As shown in FIG. 1, hydraulic excavator 100 includes a main body 1 and a work implement 2 that is hydraulically actuated. Main body 1 includes a revolving unit 3 and a traveling unit 5. Traveling unit 5 includes a pair of crawler belts 5Cr and a travel motor 5M. Rotation of crawler belts 5Cr enables hydraulic excavator 100 to travel. Travel motor 5M is provided as a driving source for traveling unit 5. Travel motor 5M is a hydraulic motor that is hydraulically actuated. Traveling unit 5 may include wheels (tires).

Revolving unit 3 is disposed on traveling unit 5 and supported by traveling unit 5. Revolving unit 3 is enabled to revolve about a revolution axis RX, with respect to traveling unit 5. Revolving unit 3 includes operator's cab 4. In operator's cab 4, operator's seat 4S on which an operator is to sit is provided. An operator (driver) onboard operator's cab 4 can manipulate work implement 2, manipulate revolving unit 3 to revolve with respect to traveling unit 5, and manipulate hydraulic excavator 100 to travel by means of traveling unit 5.

Revolving unit 3 includes an engine cover 9 and a counterweight provided in a rear part of revolving unit 3. Engine cover 9 covers an engine compartment. In the engine compartment, an engine unit (engine, exhaust gas processing device, for example) are disposed.

Work implement 2 is supported by revolving unit 3. Work implement 2 includes a boom 6, a dipper stick 7, and a bucket 8. Work implement 2 further includes a boom cylinder 10, a dipper stick cylinder 11, and a bucket cylinder 12.

Boom 6 is pivotally connected to main body 1 (traveling unit 5 and revolving unit 3). Specifically, the proximal end of boom 6 is pivotally connected to revolving unit 3 with a boom hood pin 13 serving as a fulcrum.

Dipper stick 7 is pivotally connected to boom 6. Specifically, the proximal end of dipper stick 7 is pivotally connected to the distal end of boom 6, with a boom top pin 14 serving as a fulcrum. Bucket 8 is pivotally connected to dipper stick 7. Specifically, the proximal end of bucket 8 is pivotally connected to the distal end of dipper stick 7 with a dipper stick top pin 15 serving as a fulcrum.

One end of boom cylinder 10 is connected to revolving unit 3 and the other end thereof is connected to boom 6. Boom 6 can be driven by boom cylinder 10 with respect to main body 1. Boom 6 can thus be driven to pivot upward/downward with respect to revolving unit 3, with boom hood pin 13 serving as a fulcrum.

One end of dipper stick cylinder 11 is connected to boom 6 and the other end thereof is connected to dipper stick 7. Dipper stick 7 can be driven with respect to boom 6 by dipper stick cylinder 11. Dipper stick 7 can thus be driven to pivot upward/downward or fore/aft direction with respect to boom 6, with boom top pin 14 serving as a fulcrum.

One end of bucket cylinder 12 is connected to dipper stick 7, and the other end thereof is connected to a bucket link. Bucket 8 can be driven with respect to dipper stick 7 by bucket cylinder 12. Bucket 8 can thus be driven to pivot upward/downward with respect to dipper stick 7, with dipper stick top pin 15 serving as a fulcrum.

Configuration of Boom Control System

Next, a configuration of a boom control system according to the present embodiment is described with reference to FIG. 2.

Figure 2:
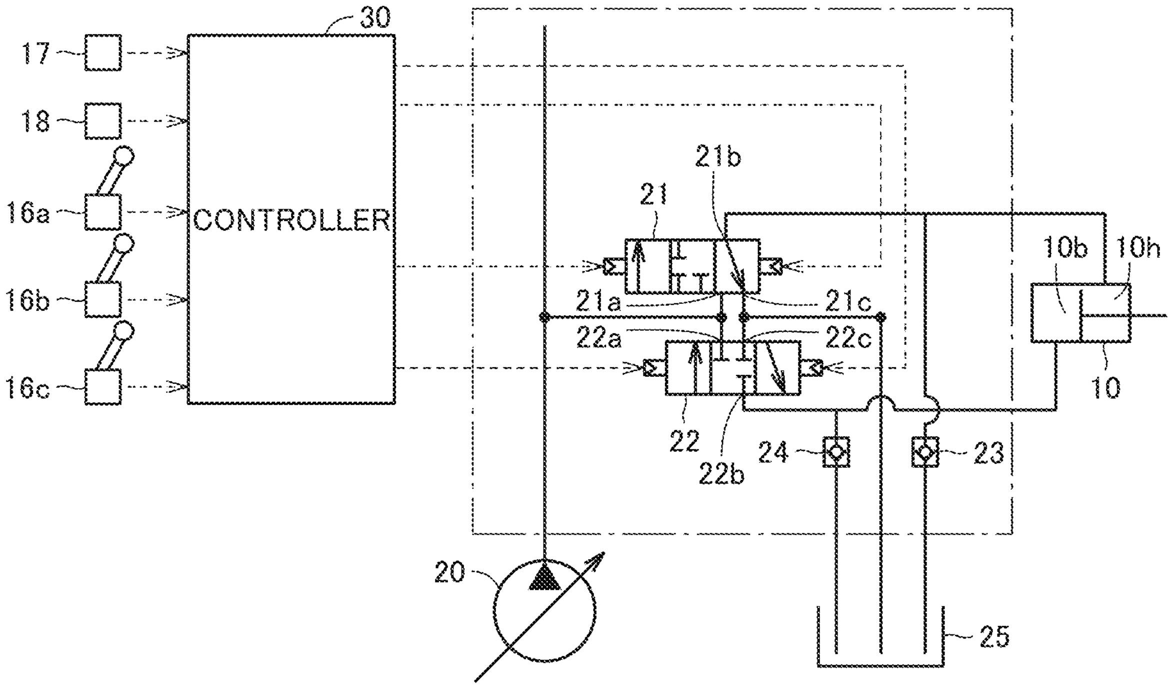
FIG. 2 shows a configuration of a boom control system of the work machine shown in FIG. 1.

FIG. 2 shows a configuration of a boom control system of the work machine shown in FIG. 1. As shown in FIG. 2, the control system of boom 6 of work machine 100 includes a boom cylinder 10, a hydraulic pump 20, a first valve 21, a second valve 22, check valves 23, 24, an oil tank 25, a controller (control unit) 30, operation apparatuses 16*a* to 16*c*, a work mode setting unit 17, and a float switch unit 18.

Boom cylinder 10 includes a head side oil chamber 10*h* and a bottom side oil chamber 10*b*. Hydraulic pump 20 supplies hydraulic oil to each of head side oil chamber 10*h* and bottom side oil chamber 10*b* of boom cylinder 10.

First valve 21 includes openings 21*a*, 21*b*, and first opening 21*c*. Opening 21*a* is a port connected to hydraulic pump 20. Opening 21*b* is a port connected to head side oil chamber 10*h*. First opening 21*c* is connected to oil tank 25 to discharge hydraulic oil from head side oil chamber 10*h* to oil tank 25.

Second valve 22 includes openings 22*a*, 22*b*, and second opening 22*c*. Opening 22*a* is a port connected to hydraulic pump 20. Opening 22*b* is a port connected to bottom side oil chamber 10*b*. Second opening 22*c* is connected to oil tank 25 to discharge hydraulic oil from bottom side oil chamber 10*b* to oil tank 25.

First valve 21 and second valve 22 each include a spool. The spool of first valve 21 and the spool of second valve 22 are designed to have the same dimensions.

First valve 21 is connected between head side oil chamber 10*h* and hydraulic pump 20. Thus, hydraulic oil can be supplied from hydraulic pump 20 to head side oil chamber 10*h* through first valve 21.

Oil tank 25 is connected to head side oil chamber 10*h* through first valve 21. Thus, hydraulic oil in head side oil chamber 10*h* can be discharged to oil tank 25 through first valve 21.

Head side oil chamber 10*h* is connected to oil tank 25 via check valve 23. Thus, oil in oil tank 25 can be supplied into head side oil chamber 10*h* through check valve 23.

Second valve 22 is connected between bottom side oil chamber 10*b* and hydraulic pump 20. Thus, hydraulic oil can be supplied from hydraulic pump 20 to bottom side oil chamber 10*b* through second valve 22.

Oil tank 25 is connected to bottom side oil chamber 10*b* through second valve 22. Thus, hydraulic oil in bottom side oil chamber 10*b* can be discharged to oil tank 25 through second valve 22.

Bottom side oil chamber 10*b* is connected to oil tank 25 through check valve 24. Thus, oil in oil tank 25 can be supplied into bottom side oil chamber 10*b* through check valve 24.

Operation apparatus 16*a* is a control lever, for example, for an operator to manipulate operation of boom 6. Operation apparatus 16*b* is a control lever, for example, for an operator to manipulate operation of dipper stick 7. Operation apparatus 16*c* is a control lever, for example, for an operator to manipulate operation of bucket 8. Respective amounts of manipulation of operation apparatuses 16*a* to 16*c* are detected, for example, by a potentiometer, a hall IC (Integrated Circuit) or the like, and input as control signals to controller 30.

Work mode setting unit 17 is an input device manipulated for input by an operator, for example. Work mode setting unit 17 may also be a display apparatus constituted of a touch panel, for example. In this case, a plurality of work modes of work implement 2 are displayed on work mode setting unit 17. Work modes of work implement 2 are, for example, scrape-off mode, breaker mode, excavation assist mode, and the like. An operator selects and touches one of a plurality of work modes displayed on work mode setting unit 17. A signal representing the work mode selected by the operator is input, as a control signal, to controller 30.

Scrape-off work is work of scraping the ground surface for land grading. Breaker work is a work of breaking rocks or hard stratum.

Float switch unit 18 is a switch, for example. An operator can manipulate float switch unit 18 to selectively make a switch between execution and non-execution of the boom float function. A switch signal representing execution or non-execution selected by the operator is input, as a control signal, to controller 30.

To controller 30, respective control signals of operation apparatuses 16*a* to 16*c*, work mode setting unit 17, and float switch unit 18 are input. During work including manipulation of boom 6, controller 30 individually controls operation of respective spools of first valve 21 and second valve 22, based on input control signals. Thus, during work including manipulation of boom 6, the opening degree of first opening 21*c* and the opening degree of second opening 22*c* are controlled individually by controller 30. Controller 30 individually controls respective opening degrees of first opening 21*c* and second opening 22*c*, based on the work mode selected through work mode setting unit 17.

Configuration of Functional Blocks of Boom Control System

Next, a configuration of functional blocks of the boom control system shown in FIG. 2 is described with reference to FIG. 3.

Figure 3:
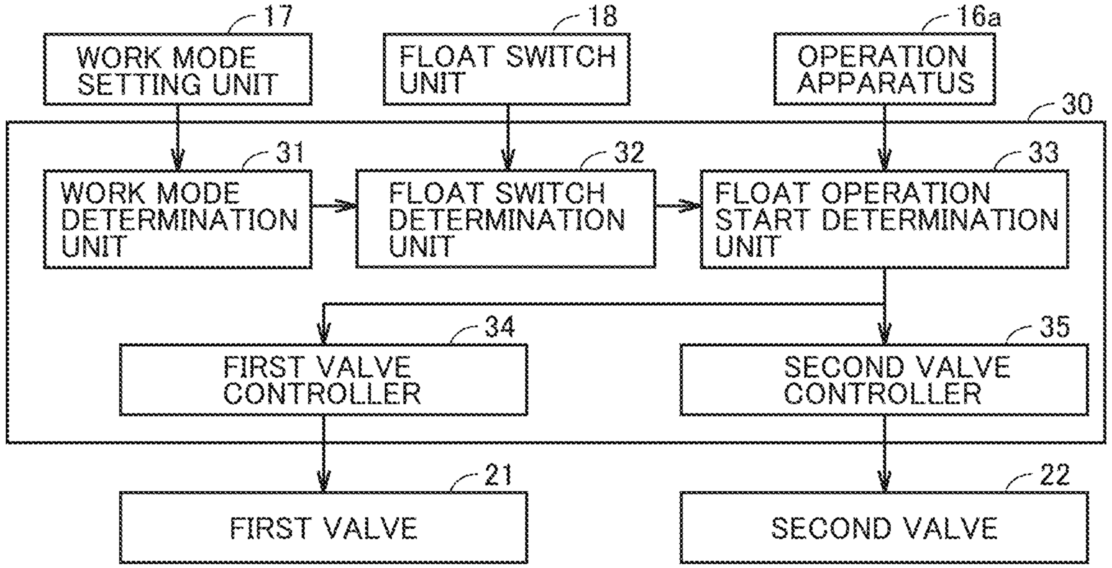
FIG. 3 shows one example of functional blocks of the boom control system shown in FIG. 2.

FIG. 3 shows one example of functional blocks of the boom control system shown in FIG. 2. As shown in FIG. 3, controller 30 includes a work mode determination unit 31, a float switch determination unit 32, a float operation start determination unit 33, a first valve controller 34, and a second valve controller 35.

Work mode determination unit 31 receives, from work mode setting unit 17, a control signal representing a work mode. Work mode determination unit 31 determines which work mode is selected by an operator, based on the control signal input from work mode setting unit 17.

Figure 11:
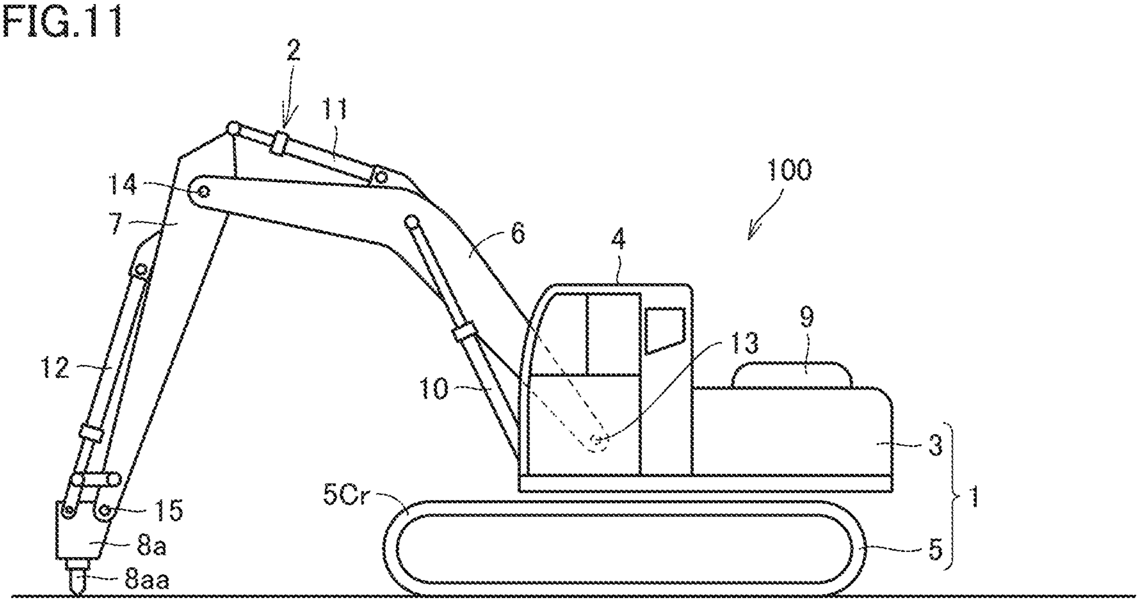
FIG. 11 is a side view showing a configuration of a work machine including a breaker as an attachment.

The work mode includes, for example, scrape-off mode, breaker mode, and excavation assist mode. The scrape-off mode is a mode of setting boom 6 in a state for causing bucket 8 to move along an uneven ground surface during scrape-off work. The breaker mode is a mode of setting for reducing vibrations of the work implement due to a breaker 8*a*, when breaker 8*a* is used as an attachment as shown in FIG. 11. The excavation assist mode is a mode of setting boom 6 in a state for releasing load on bucket 8 during excavation.

Work mode determination unit 31 determines whether the work mode selected by an operator is the scrape-off mode, the breaker mode, or the excavation assist mode, for example. Work mode determination unit 31 outputs, to float switch determination unit 32, a determination signal representing its determination.

Float switch determination unit 32 receives, from float switch unit 18, a switch signal representing execution or non-execution of the boom float function. Receiving the determination signal from work mode determination unit 31, float switch determination unit 32 determines which of execution and non-execution of the boom float function has been selected, based on the switch signal input from float switch unit 18. Float switch determination unit 32 outputs, to float operation start determination unit 33, a signal representing its determination.

Based on manipulation of operation apparatus 16*a* by an operator, float operation start determination unit 33 determines whether to start a boom float operation or not. For example, when the work mode is the scrape-off mode or the breaker mode, float operation start determination unit 33 determines that the boom float operation is to be started, based on a manipulation signal for lowering the boom. When the work mode is the excavation assist mode, for example, float operation start determination unit 33 determines that the boom float operation is to be started, based on the manipulation signal for lifting the boom.

When float operation start determination unit 33 determines that the boom float operation is to be started, float operation start determination unit 33 outputs a control signal base on the amount of manipulation of operation apparatus 16*a* to each of first valve controller 34 and second valve controller 35. Thus, the boom float operation is started, as triggered by input of the manipulation signal from operation apparatus 16*a* to float operation start determination unit 33.

Based on the control signal from float operation start determination unit 33, first valve controller 34 controls operation of first valve 21. Based on the control signal from float operation start determination unit 33, second valve controller 35 controls operation of second valve 22.

Boom Control Method

Next, a boom control method performed by the boom control system is described with reference to FIGS. 2 to 10.

Figure 4:
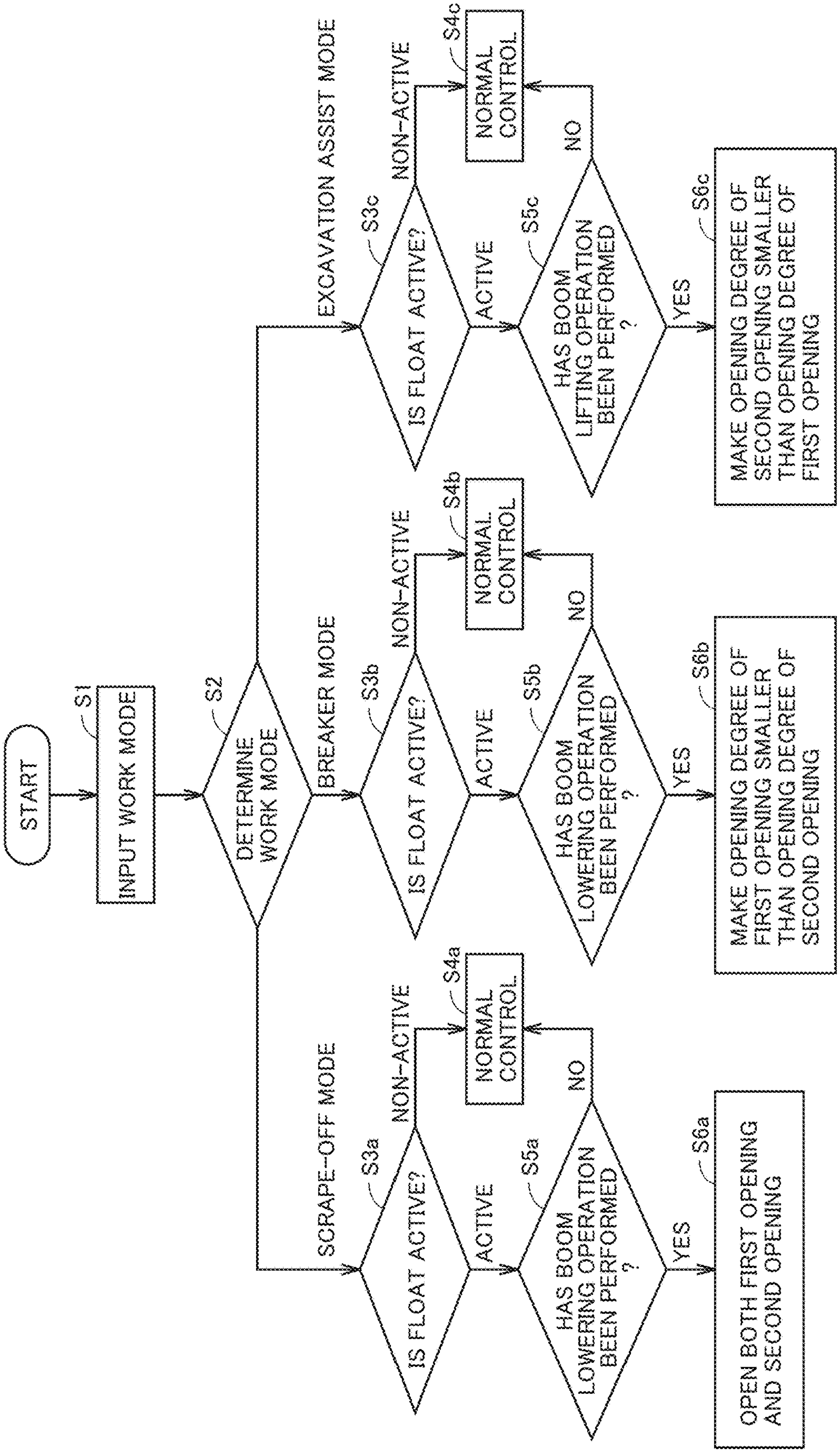
FIG. 4 is a flowchart showing one example of a boom control method for a work machine according to one embodiment of the present disclosure.
Figure 5:
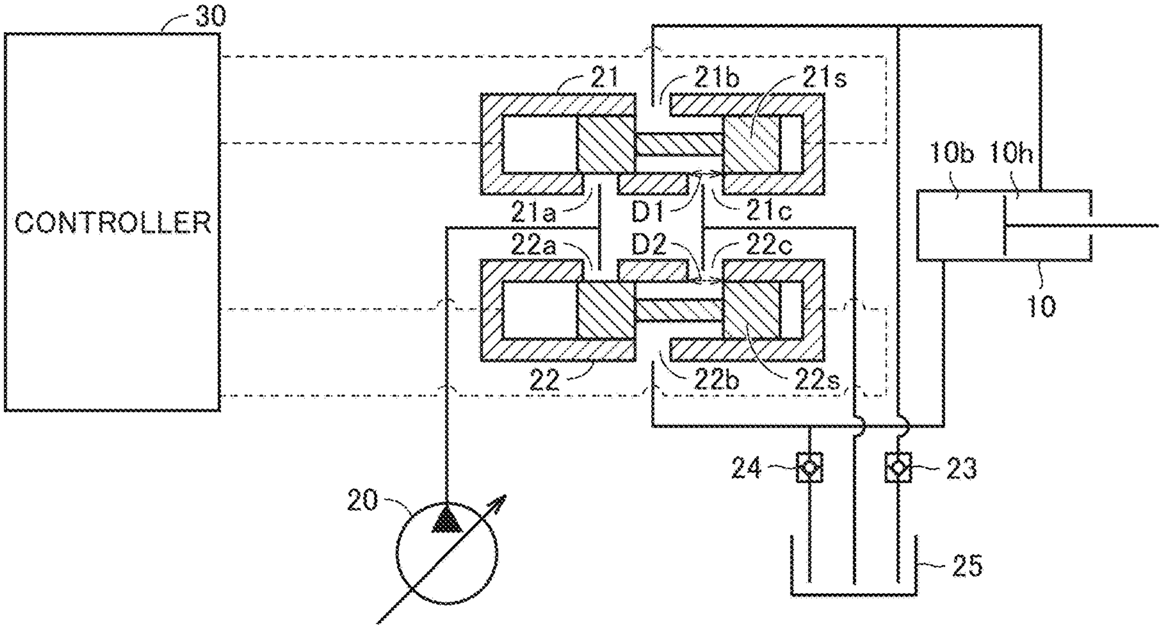
FIG. 5 shows respective states of a first valve and a second valve in a scrape-off mode.
Figure 6:
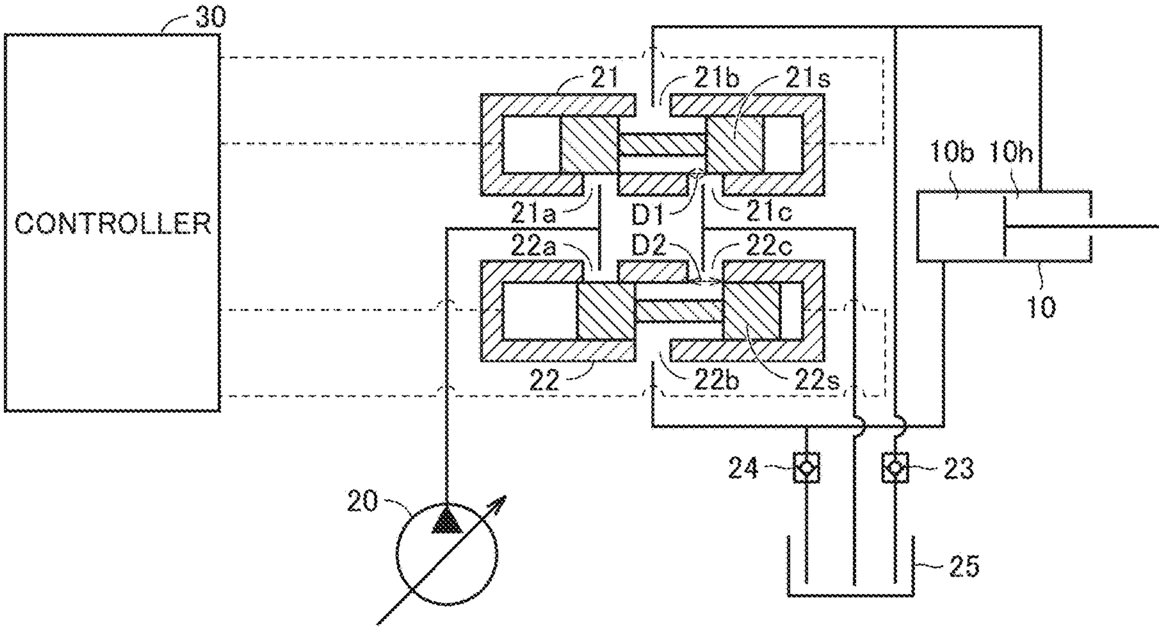
FIG. 6 shows respective states of the first valve and the second valve in a breaker mode.
Figure 7:
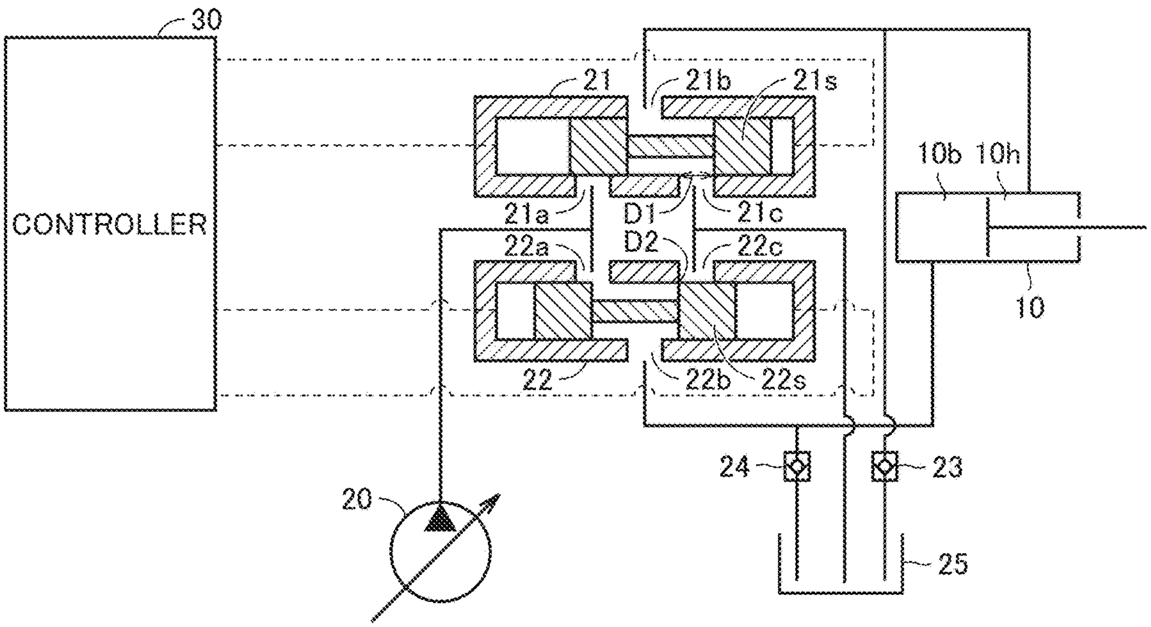
FIG. 7 shows respective states of the first valve and the second valve in an excavation assist mode.
Figure 8:
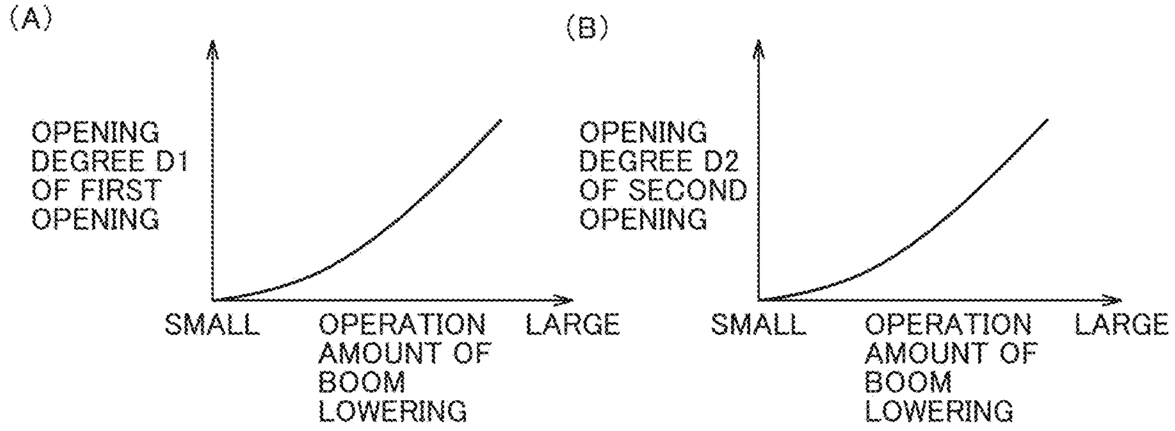
FIG. 8 shows a relation (A) between the operation amount of boom lowering and the opening degree of the first valve and a relation (B) between the operation amount of boom lowering and the opening degree of the second valve, in the scrape-off mode.
Figure 9:
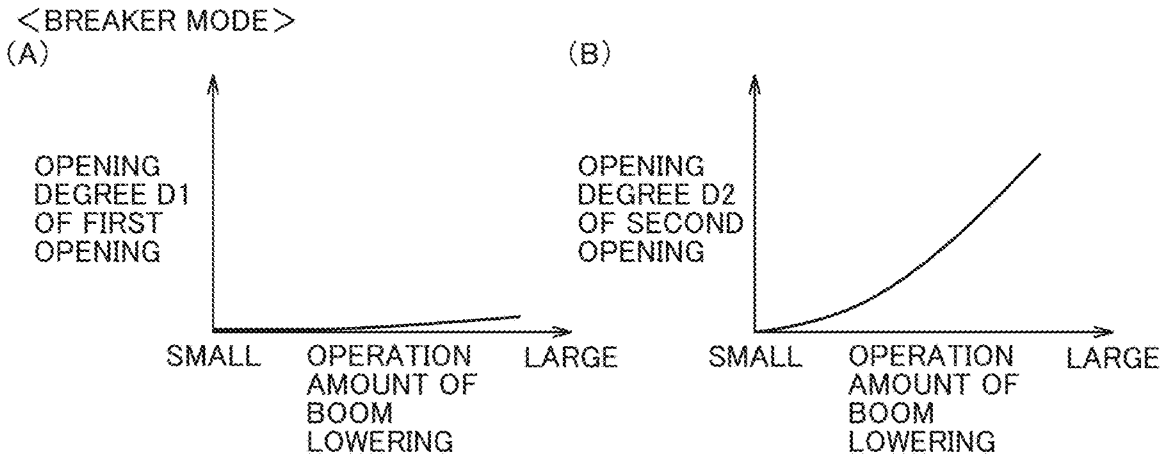
FIG. 9 shows a relation (A) between the operation amount of boom lowering and the opening degree of the first valve and a relation (B) between the operation amount of boom lowering and the opening degree of the second valve, in the breaker mode.
Figure 10:
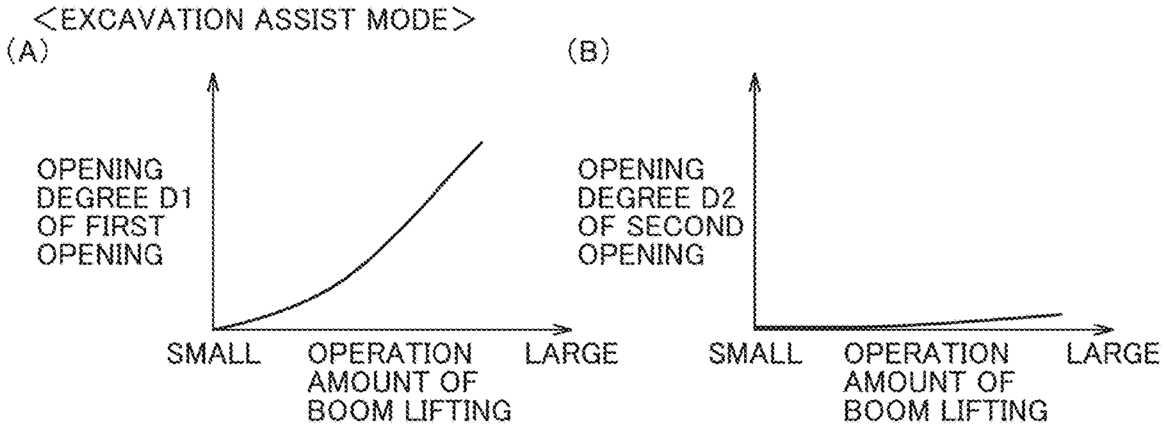
FIG. 10 shows a relation (A) between the operation amount of boom lifting and the opening degree of the first valve and a relation (B) between the operation amount of boom lifting and the opening degree of the second valve, in the excavation assist mode.

FIG. 4 is a flowchart showing one example of a boom control method for a work machine according to one embodiment of the present disclosure. FIGS. 5, 6, and 7 show respective states of the first valve and the second valve in the scrape-off mode, the breaker mode, and the excavation assist mode, respectively. FIGS. 8, 9, and 10 show a relation (A) between the amount of manipulation of the boom and the opening degree of the first valve and a relation (B) between the amount of manipulation of the boom and the opening degree of the second valve, in the scrape-off mode, the breaker mode, and the excavation assist mode, respectively.

As shown in FIGS. 3 and 4, an operator inputs a work mode by means of work mode setting unit 17. At this time, the operator touches any one of a plurality of work modes displayed on work mode setting unit 17, for example. Thus, one work mode is selected through work mode setting unit 17.

A plurality of work modes include, for example, scrape-off mode, breaker mode, and excavation assist mode, as described above. Through the operator's input, any one of the scrape-off mode, the breaker mode, and the excavation assist mode is selected, for example. A signal representing the work mode selected by the operator is input, as a control signal, to work mode determination unit 31 of controller 30 (step S1, FIG. 4).

Receiving the control signal representing the work mode from work mode setting unit 17, work mode determination unit 31 determines which work mode is selected by the operator, based on the control signal (step S2). For example, work mode determination unit 31 determines whether the work mode selected by the operator is the scrape-off mode, the breaker mode, or the excavation assist mode.

(Scrape-Off Mode)

When work mode determination unit 31 determines that the work mode is the scrape-off mode, float switch determination unit 32 determines whether the boom float function is active or not, based on the switch signal from float switch unit 18 (step S3*a*, FIG. 4).

When float switch determination unit 32 determines that the boom float function is non-active, normal control is performed (step S4*a*, FIG. 4). Under normal control, boom 6, dipper stick 7, and bucket 8 (FIG. 1) are driven in accordance with the amount of manipulation of operation apparatuses 16*a* to 16*c* (FIG. 2).

When float switch determination unit 32 determines that the boom float function is active, float operation start determination unit 33 determines whether to start the float operation or not. The determination of whether to start the float operation or not is made based on whether boom lowering operation has been performed by an operator or not (step S5*a*, FIG. 4). Float operation start determination unit 33 determines whether boom lowering operation has been performed by an operator or not, based on a manipulation signal input from operation apparatus 16*a*.

When float operation start determination unit 33 determines that boom lowering operation has not been performed, normal control is performed (step S4*a*, FIG. 4).

When float operation start determination unit 33 determines that boom lowering operation has been performed, first valve controller 34 controls operation of first valve 21 and second valve controller 35 controls operation of second valve 22. Thus, as shown in FIG. 5, respective operations of first valve 21 and second valve 22 are controlled to open first opening 21*c* of first valve 21 and second opening 22*c* of second valve 22 (step S6*a*, FIG. 4).

First valve 21 includes a spool 21*s* that controls open/close of each of openings 21*a*, 21*b* and first opening 21*c*. Second valve 22 includes a spool 22*s* that controls open/close of each of openings 22*a*, 22*b* and second opening 22*c*. First valve 21 and second valve 22 each have a solenoid (not shown), for example.

Controller 30 inputs an electrical signal to the solenoid of first valve 21 to thereby control and drive spool 21*s* of first valve 21. Thus, operation of spool 21*s* is controlled to open each of opening 21*b* and first opening 21*c* of first valve 21. Thus, hydraulic oil in head side oil chamber 10*h* of boom cylinder 10 can be discharged to oil tank 25 through opening 21*b* and first opening 21*c*.

Controller 30 inputs an electrical signal to the solenoid of second valve 22 to thereby control and drive spool 22*s* of second valve 22. Thus, operation of spool 22*s* is controlled to open each of opening 22*b* and second opening 22*c* of second valve 22. Thus, hydraulic oil in bottom side oil chamber 10*b* of boom cylinder 10 can be discharged to oil tank 25 through opening 22*b* and second opening 22*c*.

As shown in FIG. 5, when boom cylinder 10 is extended in the scrape-off mode, hydraulic oil in head side oil chamber 10*h* is discharged to oil tank 25 through first valve 21, and oil in oil tank 25 is supplied to bottom side oil chamber 10*b* through check valve 24. When boom cylinder 10 is retracted in the scrape-off mode, hydraulic oil in bottom side oil chamber 10*b* is discharged to oil tank 25 through second valve 22, and oil in oil tank 25 is supplied to head side oil chamber 10*h* through check valve 23.

In the scrape-off mode, respective opening degrees D1, D2 of first opening 21*c* and second opening 22*c* are controlled in accordance with the operation amount of lowering of boom 6 by operation apparatus 16*a*. Specifically, as shown in FIG. 8 (A), as the operation amount of lowering of boom 6 by operation apparatus 16*a* increases, controller 30 controls first valve 21 to make opening degree D1 of first opening 21*c* larger. As shown in FIG. 8 (B), as the operation amount of lowering of boom 6 by operation apparatus 16*a* increases, controller 30 controls second valve 22 to make opening degree D2 of second opening 22*c* larger.

As shown in FIG. 8 (A) and FIG. 8 (B), opening degree D1 of first opening 21*c* may be substantially identical to opening degree D2 of second opening 22*c*, with respect to the operation amount of lowering of the boom.

(Breaker Mode)

As shown in FIGS. 3 and 4, when work mode determination unit 31 determines that the work mode is the breaker mode, float switch determination unit 32 determines whether the boom float function is active or not (step S3*b*, FIG. 4). Float switch determination unit 32 determines whether the boom float function is active or not, based on the switch signal from float switch unit 18.

When float switch determination unit 32 determines that the boom float function is non-active, normal control is performed (step S4*b*, FIG. 4).

When float switch determination unit 32 determines that the boom float function is active, float operation start determination unit 33 determines whether to start the float operation or not. The determination of whether to start the float operation or not is made based on whether boom lowering operation has been performed by an operator or not (step S5*b*, FIG. 4). Float operation start determination unit 33 determines whether boom lowering operation has been performed by an operator or not, based on a manipulation signal input from operation apparatus 16*a*.

When float operation start determination unit 33 determines that boom lowering operation has not been performed, normal control is performed (step S4*b*, FIG. 4).

When float operation start determination unit 33 determines that boom lowering operation has been performed, first valve controller 34 controls operation of first valve 21 and second valve controller 35 controls operation of second valve 22. Thus, as shown in FIG. 6, respective operations of first valve 21 and second valve 22 are controlled to make opening degree D1 of first opening 21*c* of first valve 21 smaller than opening degree D2 of second opening 22*c* of second valve 22 (step S6*b*, FIG. 4).

In the breaker mode, controller 30 controls spool 21*s* to close opening 21*a* and open opening 21*b* and first opening 21*c*. Thus, hydraulic oil in head side oil chamber 10*h* of boom cylinder 10 can be discharged to oil tank 25 through opening 21*b* and first opening 21*c*.

In the breaker mode, controller 30 also controls spool 22*s* to close opening 22*a* and open opening 22*b* and second opening 22*c*. Thus, hydraulic oil in bottom side oil chamber 10*b* of boom cylinder 10 can be discharged to oil tank 25 through opening 22*b* and second opening 22*c*.

Controller 30 performs control to make opening degree D1 of first opening 21*c* smaller than opening degree D2 of second opening 22*c*. Therefore, as shown in FIG. 9 (A) and FIG. 9 (B), as the operation amount of boom lowering increases, both of opening degrees D1, D2 increase, while the rate of increase of opening degree D1 is smaller than the rate of increase of opening degree D2.

In the breaker mode, first opening 21*c* may be closed completely by spool 21*s*.

As shown in FIG. 6, when boom cylinder 10 is extended in the breaker mode, hydraulic oil in head side oil chamber 10*h* is discharged to oil tank 25 through first valve 21, and oil in oil tank 25 is supplied to bottom side oil chamber 10*b* through check valve 24. When boom cylinder 10 is retracted in the breaker mode, hydraulic oil in bottom side oil chamber 10*b* is discharged to oil tank 25 through second valve 22, and oil in oil tank 25 is supplied to head side oil chamber 10*h* through check valve 23.

(Excavation Assist Mode)

As shown in FIGS. 3 and 4, when work mode determination unit 31 determines that the work mode is the excavation assist mode, float switch determination unit 32 determines whether the boom float function is active or not (step S3*c*, FIG. 4). Float switch determination unit 32 determines whether the boom float function is active or not, based on the switch signal from float switch unit 18.

When float switch determination unit 32 determines that the boom float function is non-active, normal control is performed (step S4*c*, FIG. 4).

When float switch determination unit 32 determines that the boom float function is active, float operation start determination unit 33 determines whether to start the float operation or not. The determination of whether to start the float operation or not is made based on whether boom lifting operation has been performed by an operator or not (step S5*c*, FIG. 4). Float operation start determination unit 33 determines whether boom lifting operation has been performed by an operator or not, based on a manipulation signal input from operation apparatus 16*a*.

When float operation start determination unit 33 determines that boom lifting operation has not been performed, normal control is performed (step S4*c*, FIG. 4).

When float operation start determination unit 33 determines that boom lifting operation has been performed, first valve controller 34 controls operation of first valve 21 and second valve controller 35 controls operation of second valve 22. Thus, as shown in FIG. 7, control is performed to make opening degree D2 of second opening 22*c* smaller than opening degree D1 of first opening 21*c* (step S6*c*, FIG. 4). At this time, second opening 22*c* is closed, for example.

In the excavation assist mode, controller 30 controls spool 21*s* to open opening 21*b* and first opening 21*c*. Thus, hydraulic oil in head side oil chamber 10*h* of boom cylinder 10 can be discharged to oil tank 25 through opening 21*b* and first opening 21*c*.

In the excavation assist mode, opening degree D2 of second opening 22*c* is made smaller than opening degree D1 of first opening 21*c*, or set to zero (closed). Preferably, second opening 22*c* is completely closed.

In the excavation assist mode, respective opening degrees of first opening 21*c* and second opening 22*c* are controlled in accordance with the operation amount of lifting of boom 6 by operation apparatus 16*a*. Specifically, as shown in FIG. 10 (A), as the operation amount of lifting of boom 6 by operation apparatus 16*a* increases, controller 30 controls first valve 21 to make opening degree D1 of first opening 21*c* larger. As shown in FIG. 10 (B), even when the operation amount of lifting of boom 6 by operation apparatus 16*a* increases, opening degree D2 of second opening 22*c* does not substantially increase, or second opening 22*c* remains closed.

As seen from the foregoing, in the present embodiment, controller 30 individually controls opening degree D1 of first opening 21*c* of first valve 21 and opening degree D2 of second opening 22*c* of second valve 22. Controller 30 also individually controls opening degrees D1, D2 based on the work mode (scrape-off mode, breaker mode, excavation assist mode, for example) of work implement 2.

Based on the result of determination that the work mode is the scrape-off mode, controller 30 performs control to open both first opening 21*c* and second opening 22*c*, as shown in FIGS. 5 and (A) and (B) of FIG. 8. Based on the result of determination that the work mode is the breaker mode, controller 30 performs control to make opening degree D1 smaller than opening degree D2 as shown in FIGS. 6 and (A) and (B) of FIG. 9. Based on the result of determination that the work mode is the excavation assist mode, controller 30 performs control to make opening degree D2 smaller than opening degree D1 as shown in FIGS. 7 and (A) and (B) of FIG. 10.

Advantageous Effects

Next, advantageous effects of the present embodiment are described.

In the present embodiment, as shown in FIGS. 5 to 7, controller 30 individually controls opening degree D1 of first opening 21*c* of first valve 21 and opening degree D2 of second opening 22*c* of second valve 22. Thus, hydraulic oil in head side oil chamber 10*h* of boom cylinder 10 and hydraulic oil in bottom side oil chamber 10*b* thereof can be controlled individually to be discharged to oil tank 25. Thus, the boom float function can be adjusted depending on a current work mode, without providing an opening in the spool for boom float, or without preparing a valve for switching the boom float function, besides the main valve.

In the present embodiment, controller 30 individually controls opening degrees D1, D2, based on the work mode (scrape-off mode, breaker mode, excavation assist mode, for example) of work implement 2. Thus, a work machine for which the boom float function is adjustable depending on a current work mode such as scrape-off mode, breaker mode, and excavation assist mode can be implemented.

In the present embodiment, as shown in FIGS. 5 and (A) and (B) of FIG. 8, controller 30 performs control to open both first opening 21*c* and second opening 22*c*, based on the result of determination that the work mode is the scrape-off mode.

Thus, boom 6 is enabled to move freely upward/downward by external force. Therefore, during the scrape-off work, bucket 8 can be moved along an uneven ground surface easily. The boom float function can also be performed while bucket 8 is located in the air, so that boom 6 can be lowered to reach the ground by the weight of work implement 2.

As shown in FIG. 11, when breaker 8*a* is used as an attachment and a chisel Baa is struck in the air, a retainer pin and chisel Baa for example are likely to be chipped off and the distal end of a chisel holder is likely to be damaged. It is therefore necessary that the distal end of chisel Baa be in contact with an object to be crushed, when breaker 8*a* is caused to operate.

In the present embodiment, as shown in FIGS. 6 and (A) and (B) of FIG. 9, controller 30 performs control to make opening degree D1 smaller than opening degree D2, based on the result of determination that the work mode is the breaker mode.

Thus, while boom 6 is moved downward more easily (in the direction in which boom cylinder 10 is retracted), boom 6 is moved upward less easily (in the direction in which boom cylinder 10 is extended). Thus, in the breaker mode, the distal end of chisel Baa is prevented from being separated from an object to be crushed, so that chipping off of the retainer pin and chisel Baa for example, and damage to the chisel holder, for example, can be prevented.

In the case of demolition or the like, hard objects may be crushed. In this case, there is a possibility that work implement 2 is broken, unless the load resultant from crushing is released.

In the present embodiment, as shown in FIGS. 7 and (A) and (B) of FIG. 10, controller 30 performs control to make opening degree D2 smaller than opening degree D1, based on the result of determination that the work mode is the excavation assist mode.

Thus, while boom 6 is moved downward less easily (in the direction in which boom cylinder 10 is retracted), boom 6 is moved upward more easily (in the direction in which boom cylinder 10 is extended). Thus, when a hard object is excavated, boom 6 can be moved away upward to release the load resultant from excavation. The durability of work implement 2 can be improved in this way.

Controller 30 shown in each of FIGS. 2 and 3 in the above-described embodiment may be mounted on work machine 100 or located away from work machine 100. When controller 30 is located away from work machine 100, controller 30 may be connected wirelessly to work mode setting unit 17, float switch unit 18, operation apparatuses 16*a* to 16*c*, first valve 21, and second valve 22, for example. Controller 30 may for example be a processor, and may be a CPU (Central Processing Unit).

It should be construed that the embodiments disclosed herein are given by way of illustration in all respects, not by way of limitation. It is intended that the scope of the present invention is defined by claims, not by the description above, and encompasses all modifications equivalent in meaning and scope to the claims.

REFERENCE SIGNS LIST

1 main body; 2 work implement; 3 revolving unit; 4 operator's cab; 4S operator's seat; 5 traveling unit; 5Cr crawler belt; 5M travel motor; 6 boom; 7 dipper stick; 8 bucket; 8*a* breaker; 8*aa* chisel; 9 engine cover; 10 boom cylinder; 10*b* bottom side oil chamber; 10*h* head side oil chamber; 11 dipper stick cylinder; 12 bucket cylinder; 13 boom hood pin; 14 boom top pin; 15 arm top pin; 16*a*, 16*b*, 16*c* operation apparatus; 17 work mode setting unit; 18 float switch unit; 20 hydraulic pump; 21 first valve; 21*a*, 21*b*, 22*a*, 22*b* opening; 21*c* first opening; 21*s*, 22*s* spool; 22 second valve; 22*c* second opening; 23, 24 check valve; 25 oil tank; 30, 50 controller; 31 work mode determination unit; 32 float switch determination unit; 33 float operation start determination unit; 34 first valve controller; 35 second valve controller; 50*k* storage unit; 100 hydraulic excavator; D1, D2 opening degree; RX revolution axis

The invention claimed is:

1. A boom control system of a work machine comprising a boom, the boom control system comprising:

a boom cylinder that drives the boom and includes a head side oil chamber and a bottom side oil chamber;

a hydraulic pump;

an oil tank;

a first valve that supplies oil from the hydraulic pump to the head side oil chamber and discharges the oil to the oil tank; and a second valve that supplies oil from the hydraulic pump to the bottom side oil chamber and discharges the oil to the oil tank, wherein the first valve includes a first opening for discharging the oil in the head side oil chamber to the oil tank, the second valve includes a second opening for discharging the oil in the bottom side oil chamber to the oil tank, and the boom control system further comprises a controller that individually controls an opening degree of the first opening and an opening degree of the second opening, during work including manipulation of the boom and upon activation of a boom float function adjusts at least one of the opening degree of the first opening and the opening degree of the second opening based on a work mode selected from a plurality of work modes of a work implement including the boom and the boom cylinder.

2. The boom control system of the work machine according to claim 1, wherein the controller performs control to open both the first opening and the second opening, based on a result of determination that the work mode is a scrape-off mode.

3. The boom control system of the work machine according to claim 1, wherein the controller performs control to make the opening degree of the first opening smaller than the opening degree of the second opening, based on a result of determination that the work mode is a breaker mode.

4. The boom control system of the work machine according to claim 1, wherein the controller performs control to make the opening degree of the second opening smaller than the opening degree of the first opening, based on a result of determination that the work mode is an excavation assist mode.

5. The boom control system of the work machine according to claim 1, wherein the controller is configured to adjust the boom float function based at least in part on a signal to activate the boom float function.

6. A boom control system of a work machine comprising a boom, the boom control system comprising:

a boom cylinder that drives the boom and includes a head side oil chamber and a bottom side oil chamber;

a hydraulic pump;

an oil tank;

a first valve that supplies oil from the hydraulic pump to the head side oil chamber and discharges the oil to the oil tank; and a second valve that supplies oil from the hydraulic pump to the bottom side oil chamber and discharges the oil to the oil tank, wherein the first valve includes a first opening for discharging the oil in the head side oil chamber to the oil tank, the second valve includes a second opening for discharging the oil in the bottom side oil chamber to the oil tank, and the boom control system further comprises a controller that individually controls a first opening degree of the first opening and a second opening degree of the second opening, during work including manipulation of the boom, wherein the controller individually controls the first opening degree of the first opening and the second opening degree of the second opening, based on a work mode of a work implement including the boom and the boom cylinder, in response to a result of determination that the work mode is a scrape-off mode, the controller performs control to open both the first opening and the second opening, in response to a result of determination that the work mode is a breaker mode, the controller performs control to make the first opening degree of the first opening smaller than the second opening degree of the second opening, and in response to a result of determination that the work mode is an excavation assist mode, the controller performs control to make the second opening degree of the second opening smaller than the first opening degree of the first opening.

7. A boom control system of a work machine, the boom control system comprising:

a boom;

a boom cylinder that drives the boom and includes a head side oil chamber and a bottom side oil chamber;

a hydraulic pump;

an oil tank;

a first valve that supplies oil from the hydraulic pump to the head side oil chamber and discharges the oil to the oil tank; and a second valve that supplies oil from the hydraulic pump to the bottom side oil chamber and discharges the oil to the oil tank, wherein the first valve includes a first opening for discharging the oil in the head side oil chamber to the oil tank, the second valve includes a second opening for discharging the oil in the bottom side oil chamber to the oil tank, and the boom control system further comprises a controller that individually controls an opening degree of the first opening and an opening degree of the second opening upon activation of a boom float function and based on a result of determination of a type of a work mode of a work implement having the boom and the boom cylinder, during work including manipulation of the boom.

8. The boom control system of the work machine according to claim 7, wherein the controller performs control to open both the first opening and the second opening, based on the result of determination that the work mode is a scrape-off mode.

9. The boom control system of the work machine according to claim 7, wherein the controller performs control to make the opening degree of the first opening smaller than the opening degree of the second opening, based on the result of determination that the work mode is a breaker mode.

10. The boom control system of the work machine according to claim 7, wherein the controller performs control to make the opening degree of the second opening smaller than the opening degree of the first opening, based on the result of determination that the work mode is an excavation assist mode.

* * * * *